United States Patent [19]
Sawada et al.

[11] Patent Number: 5,895,859
[45] Date of Patent: Apr. 20, 1999

[54] PRESSURE SENSOR

[75] Inventors: Kenichi Sawada, Saitama; Tateki Mitani, Hyogo, both of Japan

[73] Assignees: Mitsubishi Denki Kabushiki Kaisha; Honda Giken Kogyo Kabushiki Kaisha, both of Tokyo, Japan

[21] Appl. No.: 08/902,912

[22] Filed: Jul. 30, 1997

Related U.S. Application Data

[63] Continuation of application No. 08/667,356, Jun. 21, 1996, abandoned, which is a continuation of application No. 08/326,200, Oct. 20, 1994, abandoned.

[30] Foreign Application Priority Data

Oct. 22, 1993 [JP] Japan ................... 5-264501

[51] Int. Cl.$^6$ .................. G01L 7/00; G01L 9/00
[52] U.S. Cl. .................. 73/706; 73/721; 73/727

[56] References Cited

U.S. PATENT DOCUMENTS

| | | | |
|---|---|---|---|
| 3,771,365 | 11/1973 | Schmepp | 73/706 |
| 4,562,742 | 1/1986 | Bell | 73/718 |
| 4,940,562 | 7/1990 | Watanabe et al. | 264/234 |
| 4,978,438 | 12/1990 | Shimamune et al. | 204/265 |
| 5,101,665 | 4/1992 | Mizuno | 73/721 |
| 5,315,867 | 5/1994 | Hartel et al. | 73/149 |
| 5,315,877 | 5/1994 | Park et al. | 73/724 |
| 5,327,776 | 7/1994 | Yasui et al. | 73/49.2 R |
| 5,369,984 | 12/1994 | Rogers et al. | 73/49.2 |
| 5,375,472 | 12/1994 | Mitani et al. | 73/706 |
| 5,438,876 | 8/1995 | Lewis | 73/726 |
| 5,544,529 | 8/1996 | Mitani et al. | 73/716 |

FOREIGN PATENT DOCUMENTS

| | | | |
|---|---|---|---|
| 5522125 | 2/1980 | Japan | 73/754 |
| 1172719 | 7/1989 | Japan | 73/754 |
| 3199653 | 8/1991 | Japan | F02D 45/00 |
| 511039 | 2/1993 | Japan | G01L 9/04 |

*Primary Examiner*—William L. Oen
*Assistant Examiner*—Paul D. Amrozowicz
*Attorney, Agent, or Firm*—Sughrue, Mion, Zinn, Macpeak & Seas, PLLC

[57] ABSTRACT

A pressure sensor comprises two sensor, a casing and a filter. A first sensor is a suction air pressure sensor for measuring the pressure of the air sucked in an internal combustion engine and the like. A second sensor is an atmospheric pressure sensor for measuring the atmospheric pressure. The casing accommodates the suction air pressure sensor and the atmospheric pressure sensor. The filter prevents the infiltration of solid matter and liquid form outside of the puressure sensor, and is mounted on the air introducing part of the atmospheric pressure sensor in the casing.

12 Claims, 3 Drawing Sheets

PRESSURE SENSOR

This is a continuation of application No. 08/667,356 filed Jun. 21, 1996, now abandoned, which is a continuation of application No. 08/326,200 filed Oct. 20, 1994 now abandoned.

BACKGROUND OF THE INVENTION

The present invention relates to a pressure sensor for measuring suction air pressure and atmospheric pressure which may be used in the form of input signals for controlling an internal combustion engine in various modes.

There is a known pressure sensor of the sort described in, for example, Unexamined Japanese Patent Publication No. Hei. 3-199653(1991). FIG. 5 illustrates such a pressure sensor and an arrangement in its peripheral portion.

In FIG. 5, reference numeral 1 denotes an intake pipe, 2 an injector for emitting a jet of fuel, 3 a throttle valve to be actuated to the extent that a driver works an accelerator pedal, 4 a pressure sensor, 5 a computer, 6 a three-way solenoid valve for switching between the pressure in the intake pipe 1 or the atmospheric pressure under instructions from the computer 5, and introducing either one into the pressure sensor 4, and an engine 7.

FIGS. 6, 7 are an elevational and a bottom view illustrating the external appearance of the pressure sensor 4.

In FIGS. 6 and 7, reference numeral 8 denotes terminals for use in exchanging signals with the computer 5, and 9 a nipple for introducing a pressure medium.

FIG. 8 illustrates an atmospheric pressure sensor 10 (different from the pressure sensor shown in FIGS. 5 through 7).

The operation of the pressure sensor shown in FIGS. 5 and 6 will subsequently be described.

The outside air is sucked through an air cleaner (not shown) and passed through the intake pipe 1 before being introduced into the intake manifold of the engine 7. On the other hand, a jet of fuel is emitted from the injector 2 into the engine 7 where compression explosions take place, whereby the power source of the internal combustion engine is provided. The amount of fuel sent out of the injector 2 is calculated by the computer 5 according to the operating information on such data as the amount of the air sucked from the intake pipe 1. Consequently, the computer 5 is loaded with various kinds of operating statuses, including the pressure in the intake pipe 1 and the atmospheric pressure. The pressure in the intake pipe and the atmospheric pressure are measured by the same pressure sensor. Since it is not possible to measure these pressures simultaneously, there is installed the three-way solenoid valve 6 at an intermediate position of the pipe for introducing the gas intended for the pressure sensor 4. By switching the valve 6, both the pressures are measured. When the throttle valve 3 is completely closed at the time of deceleration in what is proposed in the aforementioned patent publication, the three-way solenoid valve 6 is actuated so that only the atmospheric pressure is introduced into the pressure sensor 4. In this manner, one pressure sensor 4, is thus used to measure the pressure in the intake pipe and the atmospheric pressure.

Unexamined Japanese Patent Publication No. Sho. 61-205832(1986) refers to an example of a means for measuring pressure without such a three-way solenoid valve 6, wherein pressure in an intake pipe 1 is read and calculated for correction in a specific operating condition to obtain an approximate value of the atmospheric pressure.

As still another example, there has been proposed a method of measuring atmospheric pressure by means of a pressure sensor 4. Here, the pressure sensor measures pressure in an intake pipe prior to cranking, immediately after an ignition switch is turned on.

Further, there exists a known arrangement in which a suction air pressure sensor 4 and an atmospheric pressure sensor 9 are installed separately as shown in FIG. 6.

The aforementioned conventional pressure measuring devices have the following problems.

Although only one pressure sensor is designed to attain the purpose in the arrangement of FIG. 5, the three-way solenoid valve 6 is required to introduce the pressure in the intake pipe and the outside air into the pressure sensor selectively. As a result, the pressure measuring system including piping tends to become large-sized, which prevents space-saving and results an increased cost.

In the case of the example proposed in Unexamined Japanese Patent Publication No. Sho. 61-205832(1986), there arises the problem that fine control adjustments becomes impossible, because atmospheric pressure data is unavailable when it is desired and, because the precise atmospheric pressure is unobtainable as only an approximate value is supplied therewith.

With respect to the method of measuring atmospheric pressure before cranking, the problem is that the atmospheric pressure may become impossible to measure, depending on the operating mode before cranking after the switch is turned on (since the IC needs resetting).

The provision of the pressure sensor for measuring the pressure in the intake pipe and the atmospheric sensor separately naturally poses a cost-push problem.

An object of the present invention made to solve the foregoing problems is to provide a compact, light-weight pressure sensor which makes it possible to simultaneously obtain an intake pipe pressure and the atmospheric pressure both separately and independently.

SUMMARY OF THE INVENTION

In order to solve the foregoing problems, a pressure sensor according to the present invention comprises a pressure sensor comprising two sensors, a casing and a filter. One sensor is a suction air pressure sensor for measuring the pressure of the air sucked in an internal combustion engine and the like. The other is an atmospheric pressure sensor for measuring the atmospheric pressure. The casing accommodates the suction air pressure sensor and the atmospheric pressure sensor. The filter prevents the infiltration of solid and liquid matter from outside, and is mounted on the air introducing part of the atmospheric pressure sensor in the casing.

According to the present invention, the pressure of either the air sucked into the internal combustion engine or the pressure in the fuel tank is measured, whereas the air introduced through the air introducing part is measured by the atmospheric pressure sensor, so that each of the pressures can be measured separately and independently. Moreover, the filter provided for the air introducing part prevents the infiltration of solid matter and gas from the outside.

DETAILED DESCRIPTION OF THE PREFERRED EMBODIMENTS

Referring to the accompanying drawings, embodiments of the present invention will subsequently be described.

Figure 1:
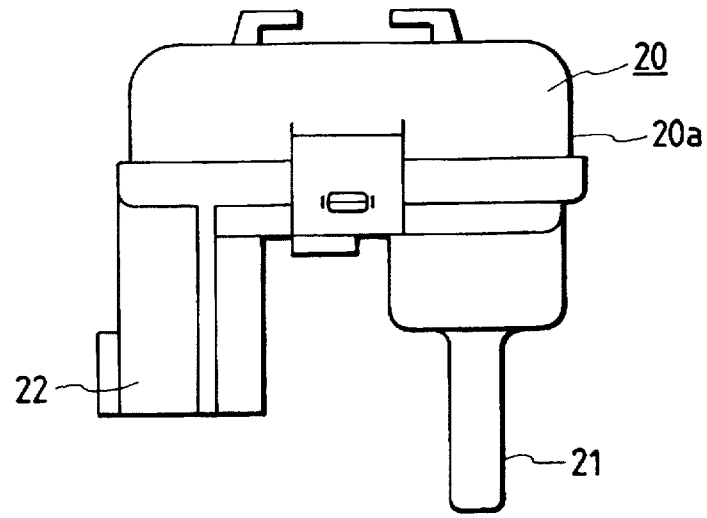
FIG. 1 is an elevational view of a pressure sensor embodying the present invention.
Figure 2:
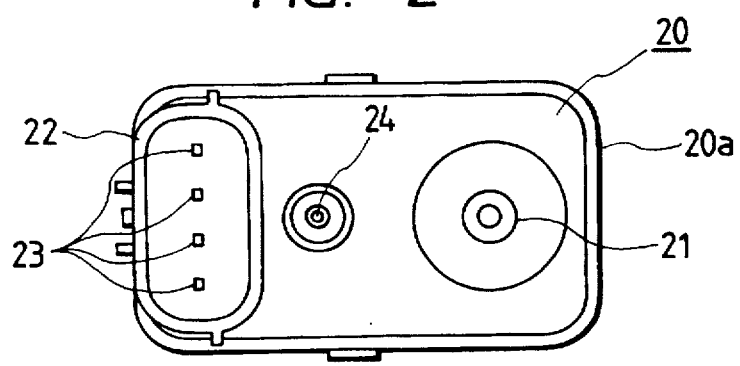
FIG. 2 is a bottom view of the pressure sensor of FIG. 1.
Figure 3:
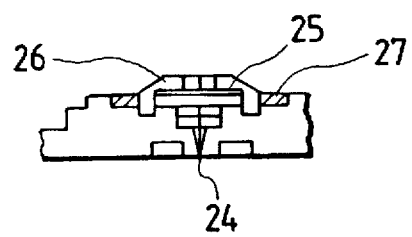
FIG. 3 is a sectional view of an area in the neighborhood of the air introducing hole of the pressure sensor of FIG. 1.

FIGS. 1, 2, 3 illustrate a pressure sensor according to the present invention: FIG. 1 is an elevational view of the pressure sensor; FIG. 2 is a bottom view thereof; and FIG. 3 is an enlarged sectional view of an air introducing part.

In FIGS. 1, 2, 3, reference numeral 20a denotes a case forming a pressure sensor 20, the case 20a accommodating a sensor for detecting pressure in an intake pipe and a sensor for detecting atmospheric pressure separately and independently.

Further, reference numeral 21 denotes a nipple for introducing the pressure in the intake pipe and the like, 22 a connector for connecting the sensor 20 to a computer as mentioned in reference to the conventional pressure sensor, and 23 terminals of the connector.

Further, reference numeral 24 denotes an air introducing hole for introducing the outside air to the atmospheric pressure sensor in the case 20a. FIG. 3 illustrates the environment of the air introducing hole 24 in cross section. In FIG. 3, reference numeral 25 denotes a filter which is made of material containing fluorine resin, as this resin has excellent heat and chemical resistant properties, 26 a cap, and 27 an adhesive.

This pressure sensor is coupled communicatively via a pipe to the intake passage of an engine.

The operation of the pressure sensor will subsequently be described.

Part of the air sucked in the intake passage of the engine is passed through the nipple 21 and led toward the pressure sensor 20. Then suction air pressure in the intake pipe is measured by a suction air sensor in the pressure sensor 20. Although the suction air pressure becomes one of the elements when the amount of fuel in the jets is calculated, it may need correcting by means of the atmospheric pressure some time. For this reason, the outside air is introduced through the air introducing hole 24 and the atmospheric air pressure is measured by the atmospheric pressure sensor in the pressure sensor 20. Since the filter 25 is provided for the air introducing hole 24, solid matter and liquid from the outside, particularly dust and water drops, are prevented thereby from infiltrating into the pressure sensor 20.

The pressure in the intake pipe and the atmospheric pressure that have thus been measured are converted into corresponding voltages, and then sent from the connector 22 via the terminals 23 to the computer.

The embodiment 1 of the present invention refers to a pressure sensor capable of simultaneously measuring the pressure inside the intake pipe and the atmospheric pressure. The pressure sensor is also applicable to a case where the pressure inside the fuel tank and the atmospheric pressure are simultaneously measured.

Figure 4:
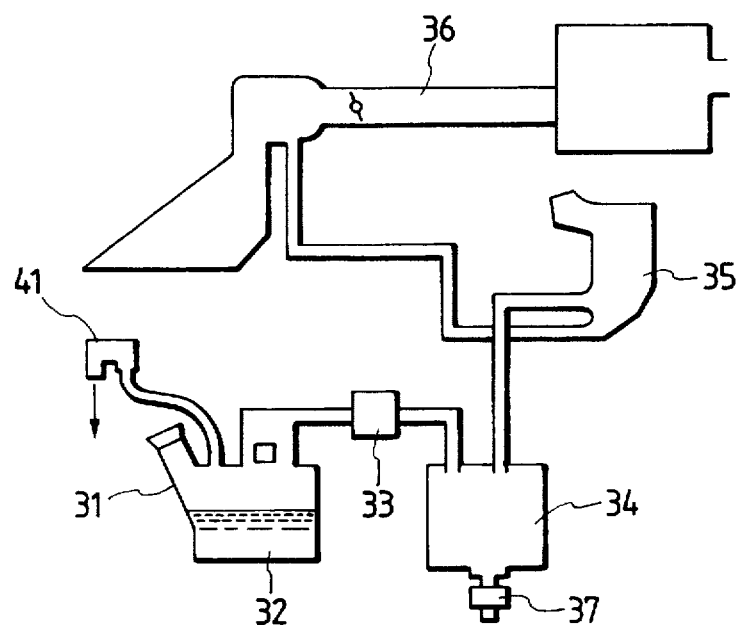
FIG. 4 is a diagram illustrating a fuel leakage detection system using another pressure sensor embodying the present invention.
Figure 5:
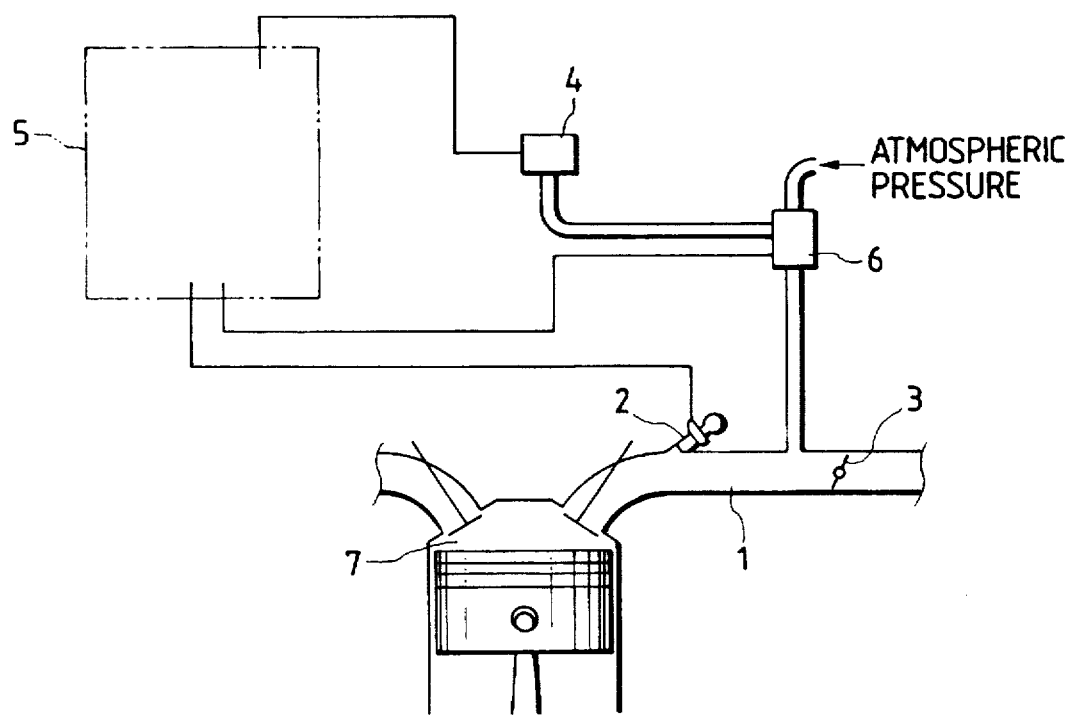
FIG. 5 is a diagram illustrating a conventional pressure measuring system.
Figure 6:
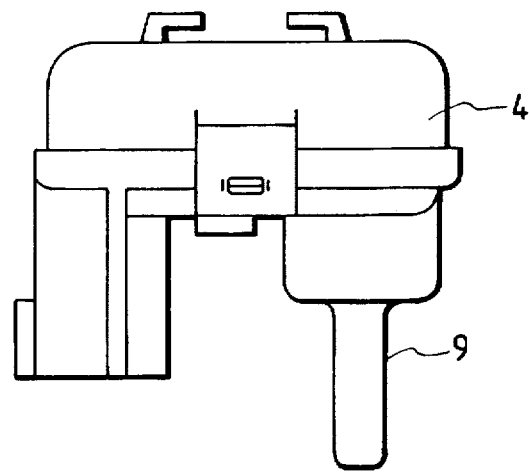
FIG. 6 is an elevational view of a conventional pressure sensor.
Figure 7:
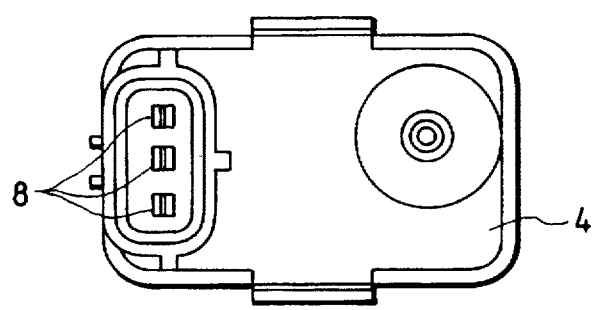
FIG. 7 is a bottom view of the pressure sensor of FIG. 6.
Figure 8:
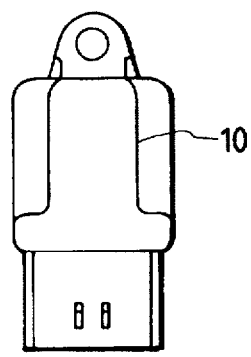
FIG. 8 is an elevational view of a conventional atmospheric pressure sensor.

FIG. 4 refers to the case above.

In FIG. 4, reference numeral 31 denotes a fuel tank for storing fuel 32; 33 a check valve which opens and closes in accordance with pressure in the fuel tank 31; 34 a canister normally containing activated carbon; and 35 a purge control valve which opens and closes so as to control the flow of evaporated gas emanating from the fuel 32 into the intake pipe 36 of the engine.

Further, reference numeral 41 denotes a pressure sensor for measuring the steam pressure of the fuel in the fuel tank 31 simultaneously with the atmospheric pressure, and 37 a solenoid valve for opening and closing a passage between the atmosphere and the fuel tank 31 via the canister 34. The pressure sensor 41 is similar in not only external appearance but also using a filter to what has been shown according to Embodiment 1. However, both of the pressure sensors 20, 41 are different in the internal material and their characteristics.

The operation will subsequently be described.

The fuel 32 in the fuel tank 31 evaporates into gas as the ambient temperature rises. The evaporated fuel gas reaches the check valve 33 and is cut off when it remains closed. However, the check valve 33 opens when the pressure in the fuel tank 31 exceeds a predetermined level and the evaporated gas flows into the activated carbon (not shown) contained in the canister 34. The evaporated gas is caused to adhere to the activated carbon at this stage. When the purge control valve 35 opens under instructions from the computer (not shown) during the operation of the internal combustion engine (not shown), the evaporated fuel gas adhering to the activated carbon is released therefrom into the intake pipe 36 for combustion. As a result, the activated carbon is regenerated.

In the above case, the pressure sensor 41 and the solenoid valve 37 are installed to determine whether leakage occurs in the passage of the evaporated gas passage. When the purge control valve 35 and the solenoid valve 37 are closed during operation, for example, the evaporated gas passage is shut out from the outside. Part of the evaporated gas is then introduced via the nipple into the pressure sensor 41. By referring to the output variation of the pressure sensor 41, any leakage in the passage becomes detectable. As the atmospheric sensor is provided in the pressure sensor 41, the atmospheric pressure may be measured simultaneously when the atmospheric pressure sensor for controlling the fuel (not shown) is used simultaneously as the pressure sensor. Any signal deriving from the atmospheric pressure is usable for any other different kind of control operation by sending the atmospheric pressure signal to the computer (not shown).

As set forth above, not only the suction air pressure in the internal combustion engine or the pressure in the fuel tank, but also the atmospheric pressure introduced from the air introducing part, is made measurable according to the present invention, whereby the pressure sensor for the intake pipe and the pressure sensor for the atmospheric pressure can be accommodated in one single case. The pressure measuring system can thus be made less expensive without increasing the scale of the system configuration. Moreover, the filter prevents dust and water drops from infiltrating into the atmospheric pressure sensor. This makes it also possible to increase the precision of the atmospheric pressure sensor.

The filter made of the material containing fluorine resin ensures that it has satisfactory heat and chemical resistant properties and that the effect of preventing outside dust and like from infiltrating therethrough is prolonged.

What is claimed is:

1. A pressure system for an internal combustion engine comprising:

a fuel tank for storing liquid fuel;

an activated carbon canister containing activated carbon for adherence to fuel vapors released from said liquid fuel;

a solenoid valve for controlling the influx of atmospheric air into said activated carbon canister;

a check valve which connects said fuel tank with said activated carbon canister and opens when a fuel pressure of said fuel vapors surpasses a predetermined level;

a purge control valve operated to control a flow of fuel vapors adhered to said activated carbon into said internal combustion engine;

a suction air pressure sensor for measuring said fuel pressure;

an atmosphere pressure sensor for measuring the atmospheric pressure;

a casing for accommodating said suction air pressure sensor and said atmospheric pressure sensor;

a filter made of a fluorine resin material for preventing the infiltration of solid matter and liquid matter into said casing, said filter being mounted on an air introducing part of the atmospheric pressure sensor in the casing; and a cap having a U-shape cross section, mounted to said air introducing part to secure said filter over an air introducing hole in said casing so that said cap is partially inserted into a groove formed on an inside wall of said casing.

wherein an adhesive is applied between an outer surface of said cap and said inside wall of said casing.

2. A fuel pressure system for an internal combustion engine which includes a sensor for measuring simultaneously at least two pressures corresponding respectively to environmental air and a fuel pressure of fuel vapors emitted from fuel disposed in a fuel tank, said fuel pressure system comprising:

an activated carbon canister containing activated carbon for adherence to said fuel vapors;

a solenoid valve for controlling the influx of environmental air into said activated carbon canister;

a check valve which connects said fuel tank with said activated carbon canister and opens when said fuel pressure of said fuel vapors surpasses a predetermined level;

a purge control valve operated to control a flow of fuel vapors adhered to said activated carbon into said internal combustion engine, wherein said sensor comprises:

a hole for introducing environmental air;

a nipple for introducing said fuel vapors;

a first pressure sensor for measuring the pressure of said environmental air introduced into said hole;

a second pressure sensor for measuring said fuel pressure;

a casing for accommodating said first and second pressure sensors;

a filter made of a fluorine resin material for preventing the infiltration of solid matter and liquid matter from outside of said first pressure sensor, said filter being mounted on said casing to cover said hole; and a cap having a U-shaped cross section, mounted to said casing to secure said filter over said hole in said casing, said cap partially inserted into a groove formed on an inside wall of said casing and an adhesive applied between an outer surface of said cap and said inside wall of said casing, wherein said sensor is constructed such that said hole and said nipple face downward.

3. A pressure sensing device for measuring simultaneously at least two pressures, comprising:

an external air introduction portion for providing external air to said device, comprising: an air introducing hole for introducing external air to said device; a filter located within said external air introduction portion which removes solid and liquid matter from said external air; a cap having a U-shape cross section partially inserted in an inside wall of said external air introduction portion by an adhesive applied between an outer surface of said cap and said inside wall of said external air introduction portion;

a nipple for introducing a gas other than said external air to said device;

a first pressure sensor for measuring a first pressure corresponding to said external air;

a second pressure sensor for measuring a second pressure corresponding to said gas other than said external air;

a housing assembly for housing said first and second pressure sensors;

a connector comprising a plurality of terminals for connecting a peripheral device to said sensors, wherein said filter purifies the external air supplied to said first pressure sensor, wherein said pressure sensing device is constructed such that said air introducing hole and said nipple face downward.

4. A fuel pressure system for an internal combustion engine comprising:

a fuel tank for storing liquid fuel;

an activated carbon canister containing activated carbon for adherence to fuel vapors released from said liquid fuel;

a solenoid valve for controlling the influx of atmospheric air into said activated carbon canister;

a check valve which connects said fuel tank with said activated carbon canister and opens when a fuel pressure of said fuel vapors surpasses a predetermined level;

a purge control valve for controlling a flow of fuel vapors adhered to said activated carbon into said internal combustion engine;

a pressure sensing device comprising:

an external air introduction portion for providing external air to said device, comprising: an air introducing hole for introducing external air to said pressure sensing device; a filter located within said pressure sensing device which removes solid and liquid matter from said external air; a cap having a U-shape cross section partially inserted into a groove formed on an inside wall of said external air introduction portion by an adhesive, wherein said adhesive is applied between an outer surface of said cap and said inside wall of said external air introduction portion;

a nipple for introducing said fuel vapors to said device;

a first pressure sensor for measuring a pressure corresponding to said external air;

a second pressure sensor for measuring said fuel pressure;

a housing assembly for housing said first and said second pressure sensors; and a connector portion comprising a plurality of terminals for connecting a peripheral device to said first and second pressure sensors, wherein said filter serves to purify the external air supplied to said first pressure sensor, and wherein said pressure sensing device operates when said purge control valve and said solenoid valve are closed to independently measure said first pressure and said second pressure.

5. A pressure sensing device according to claim 4, wherein said filter is comprised at least partially of fluorine resin.

6. A pressure sensing device according to claim 3, wherein said cap is connected to said external air introduction portion over said air introducing hole to secure said filter over said air introducing hole.

7. A pressure sensing device according to claim 3, wherein said filter is comprised at least partially of fluorine resin.

8. A fuel pressure system according to claim 4, wherein said cap is connected to said external air introduction portion over said air introducing hole to secure said filter over said air introducing hole.

9. A pressure system according to claim 1, further comprising an adhesive which secures said cap to said air introducing part.

10. A fuel pressure system according to claim 2, further comprising an adhesive which secures said cap to said casing.

11. A pressure system as claimed in claim 1, wherein said casing has a nipple into which said fuel vapors are received, and said casing is constructed so that said air introducing hole and said nipple face downward.

12. A fuel pressure system as claimed in claim 4, wherein said pressure sensing device is constructed so that said air introducing hole and said nipple face downward.

* * * * *